United States Patent [19]

Simm et al.

[11] 4,349,206

[45] Sep. 14, 1982

[54] SEALING ARRANGEMENT FOR TUBULAR ELEMENTS OF FLOOR CARE DEVICE

[75] Inventors: Hans-Peter Simm, Wuppertal; Wieland Gühne, Remscheid; Klaus Hoffmann, Haan, all of Fed. Rep. of Germany

[73] Assignee: Vorwerk & Co. Interholding GmbH, Wuppertal, Fed. Rep. of Germany

[21] Appl. No.: 272,555

[22] Filed: Jun. 11, 1981

[30] Foreign Application Priority Data

Jun. 13, 1980 [DE] Fed. Rep. of Germany ... 8015672[U]

[51] Int. Cl.³ .......................... F16J 15/10; F16J 15/32
[52] U.S. Cl. .................................. 277/207 R; 277/152; 277/165; 277/212 F; 220/378
[58] Field of Search ........... 277/152, 153, 165, 207 R, 277/207 A, 212 F, 212 R, 212 C; 220/378

[56] References Cited

U.S. PATENT DOCUMENTS

| 2,571,015 | 10/1951 | Columbus | 277/207 X |
| 4,114,668 | 9/1978 | Hickey | 220/378 X |

FOREIGN PATENT DOCUMENTS

| 897645 | 11/1953 | Fed. Rep. of Germany | 220/378 |
| 2719410 | 11/1978 | Fed. Rep. of Germany | 277/152 |
| 74881 | 1/1961 | France | 277/207 |

*Primary Examiner*—Robert S. Ward, Jr.
*Attorney, Agent, or Firm*—Michael J. Striker

[57] ABSTRACT

A sealing arrangement for sealing two tubular members of a floor care device has an elastic ring provided on one of the tubular members and having radially outer and radially inner lips arranged in a V-shaped manner, and a V-shaped edge provided on the end face of the other of the tubular members and cooperating with the radially outer lip of the elastic ring upon movement of the tubular members toward one another.

8 Claims, 2 Drawing Figures

SEALING ARRANGEMENT FOR TUBULAR ELEMENTS OF FLOOR CARE DEVICE

BACKGROUND OF THE INVENTION

The present invention relates to a sealing arrangement for tubular elements of a floor care device. More particularly, it relates to a sealing arrangement for sealing of two tubular elements which are movable toward and away from each other and arranged to pass a gaseous medium.

Sealing arrangements of the above-mentioned general type are known in the art. A known sealing arrangement which is utilized for sealing tubular elements of a floor care device, which move relative to one another, is formed as axial sealing members which have end faces and press against one another by these and faces. These sealing members are used at separating locations between a suction pipe and a filter inlet, an exhaust pipe and a filter inlet, an impeller outlet and a filter inlet and at other locations, in dependence on the construction and operation of the device. These sealing members are pressed or spanned between the edges of the tubular elements. Such a construction has the disadvantage that the parts which are to be connected and spanned against one another with the aid of these sealing members must satisfy very high requirements with respect to tolerances.

SUMMARY OF THE INVENTION

Accordingly, it is an object of the present invention to provide a sealing arrangement which avoids the disadvantages of the prior art.

More particularly, it is an object of the present invention to provide a sealing arrangement which performs sealing action in radial direction without pressing and spanning so as to reduce requirements to the tolerances.

In keeping with these objects and with others which will become apparent hereinafter, one feature of the present invention resides, briefly stated, in a sealing arrangement for sealing two tubular elements of a floor care device, which tubular members are axially movable toward and away from one another and arranged to pass a gaseous medium, wherein the seaing arrangement includes an elastic ring provided on one of the tubular members and having radially outer and radially inner lips located in a V-shaped manner, and a V-shaped edge provided on an end face of the other of the tubular members and cooperating with the radially outer lip of the elasting ring upon movement of the tubular members toward one another.

When a sealing arrangement is designed in accordance with the present invention, it provides the advantage that the sealing arrangement is simple and at the same time during movement of the tubular elements provides an engagement so that only small requirements are made with respect to the size accuracy of the connection.

In accordance with another feature of the invention, the radially outer lip of the elastic ring extends outwardly beyond a circumference of the diameter of the elastic ring, whereas the radially inner lip is formed at an inner side of the elastic ring and extends normal to this side.

Still a further feature of the present invention resides in the fact that the V-shaped edge of the other tubular member is arranged outside of the diameter of the elastic ring and fitted into the outer lip of the elastic ring.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
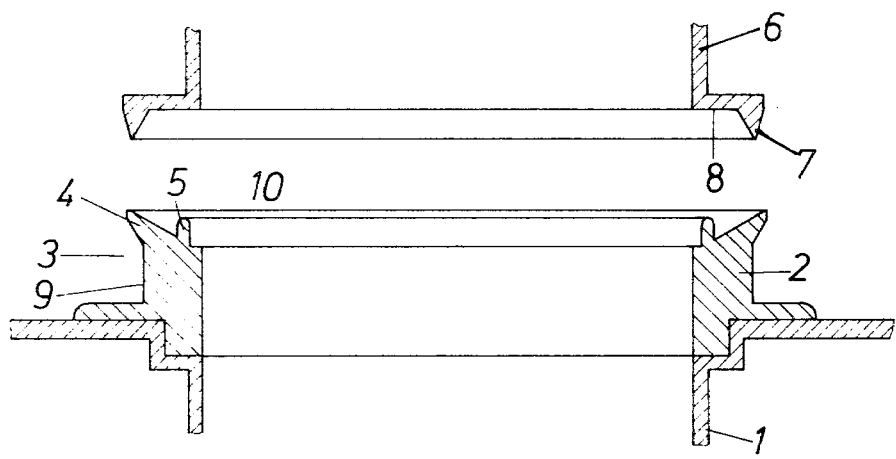
FIG. 1 is a view showing a section of a sealing arrangement in accordance with the present invention, in an open position.

A sealing arrangement in accordance with the present invention in an open position is schematically shown in FIG. 1. It includes a tubular element identified by reference numeral 1 and an elastic ring 2 arranged on the tubular member 1.

The elasting ring 2 has an end side 3 and is provided at this end side with two lips 4 and 5 arranged in a V-shaped manner. The lip 4 is a radially outer lip, whereas the lip 5 is a radially inner lip.

The lip 4 of the elastic ring 2 is longer than the lip 5 and extends outwardly beyond a circumference 9 defining the diameter of the elastic ring 2. The lip 5 is located at an inner side 10 of the elastic ring 2 and extends in a normal direction to the latter. More particularly, the inner lip 5 extends in an axial direction. The outer lip 4 is inclined to the inner side of the elastic ring 2 as well as to the axial direction.

Another tubular member is identified by reference numeral 6 and has an end face 8 which faces toward the end face 10 of the elastic ring 2. A V-shaped edge 7 is provided at an end face 8 of the tubular member 6. The V-shaped edge 7 is circular and has such a diameter that in the closed condition of the sealing arrangement or, in other words, when the tubular members 1 and 6 are moved toward one another, the edge 7 is seated on the outer lip 4.

Figure 2:
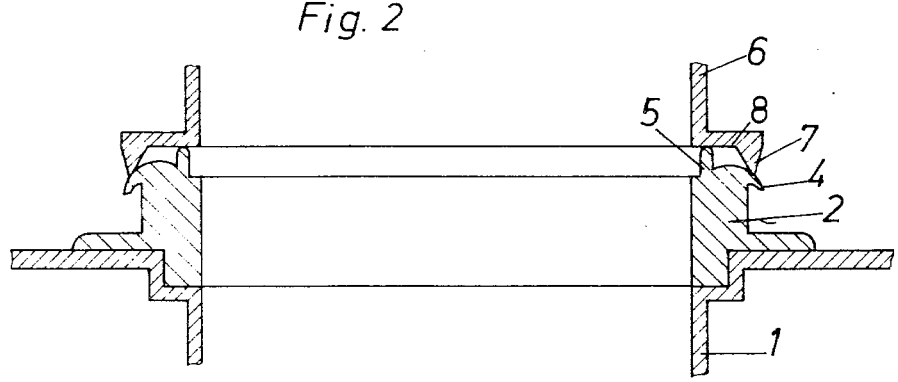
FIG. 2 is a view substantially corresponding to the view of FIG. 1, but showing the inventive arrangement in a closed position.

The position in which the tubular members 1 and 6 are moved toward one another and sealed is shown in FIG. 2. The tubular member 6 is seated with its end face 8 against the elastic ring 2, and more particularly against its inner lip 5. At the same time, the V-shaped edge 7 of the tubular member 6 is pressed behind the outer lip 4 of the elastic ring 3 and engages over the same so as to squeeze this lip.

Thereby, this construction allows to take up higher tolerances in a certain region than, in the event of sealing of two end faces pressed against one another.

It will be understood that each of the elements described above, or two or more together, may also find a useful application in other types of constructions differing from the types described above.

While the invention has been illustrated and described as embodied in a sealing arrangement for tubular members of a floor care device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sealing arrangement for sealing two tubular members of a floor care device, the tubular members being axially movable toward and away from one another and arranged to pass a gaseous medium, the sealing arrangement comprising an elastic ring arranged to be provided on one of said tubular members and having two lips, said lips including radially inner and outer lips located V-shaped and having an end face; and a V-shaped edge arranged to be provided on an end face of the other of said tubular members and cooperating with said radially outer lip of said elastic ring upon movement of the tubular members toward one another.

2. An arrangement as defined in claim 1, wherein said elastic ring has a predetermined diameter, said radially outer lip extending radially outwardly beyond a circumference corresponding to the diameter of said elastic ring.

3. An arrangement as defined in claim 2, wherein said elastic ring has an inner side facing toward the other tubular member, said radially inner lip of said elastic ring being arranged at said inner side of said elastic ring.

4. An arrangement as defined in claim 3, wherein said radially outer lip of said elastic ring is inclined to said inner side.

5. An arrangement as defined in claim 4, wherein said radially inner lip of said elastic ring extends normal to said inner side.

6. An arrangement as defined in claim 5, wherein said radially inner lip of said elastic ring extends in an axial direction.

7. An arrangement as defined in claim 1, wherein said elastic ring has a predetermined diameter, said V-shaped edge of the other tubular member being arranged radially outwardly of a circumference corresponding to the diameter of said elastic ring and fittable onto said radially outer lip of the latter.

8. An arrangement as defined in claim 7, wherein the other tubular member has an end face axially offset from said V-shaped edge, said radially inner lip being arranged to abut against the end face of the other tubular member.

* * * * *